Patented Dec. 25, 1928.

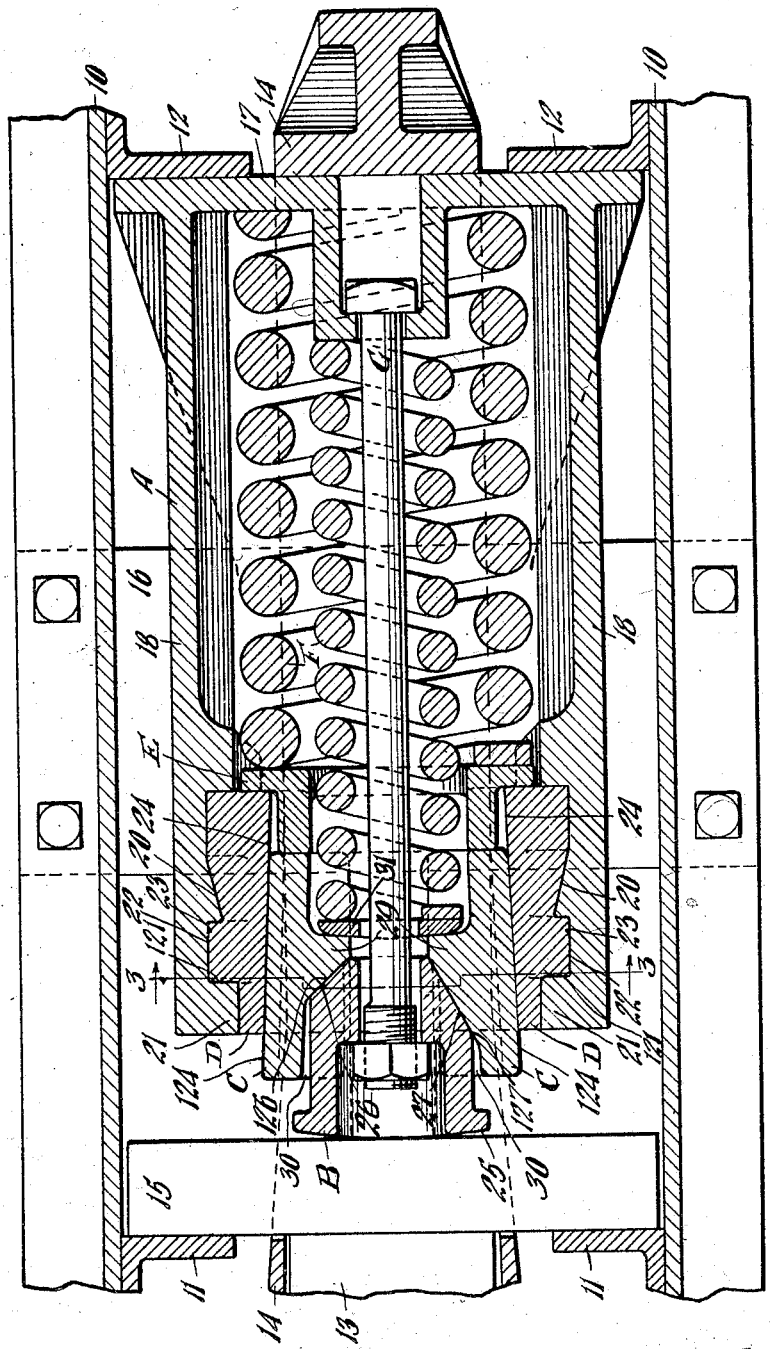

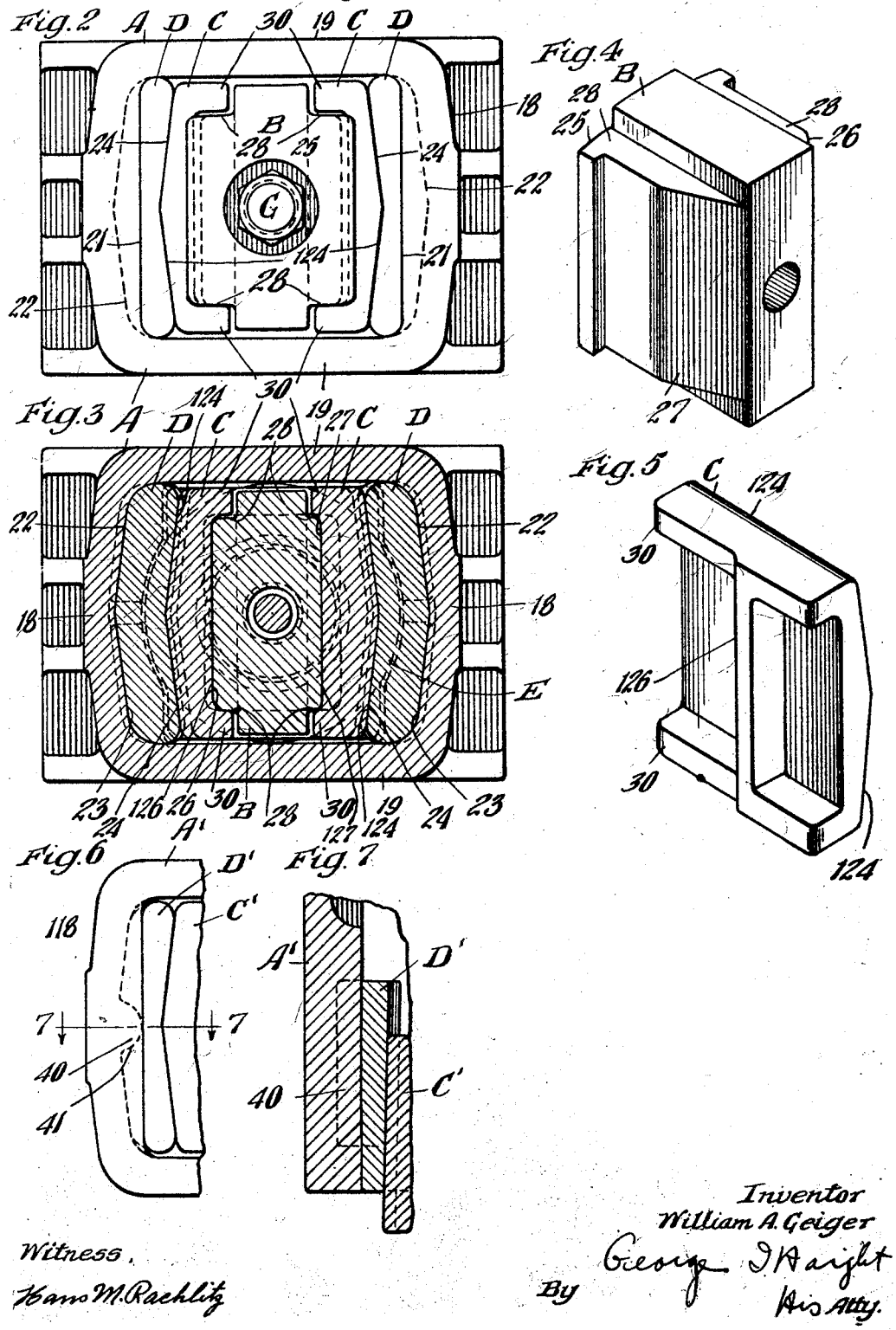

1,696,351

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 5, 1927, Serial No. 166,058. Renewed November 7, 1928.

This invention relates to improvements in friction shock absorbing mechanism.

One object of the invention is to provide a friction shock absorbing mechanism especially adapted for railway draft riggings, including a column element in the form of a casing provided with a plurality of opposed walls, certain of which have friction surfaces and a friction wedge system co-operating therewith, wherein the friction system is maintained in spaced relation with reference to the walls of the shell with which it does not frictionally co-operate to prevent wear of the casing.

Another object of the invention is to provide a friction shock absorbing mechanism of the character indicated, including a rectangular friction shell having two opposed walls provided with friction surfaces with which co-operates a friction system including friction shoes and a wedge member, wherein means is provided for confining the wedge member and friction shoes to relative longitudinal movement only, thereby preventing displacement of the friction system and eliminating wear and damage to the friction shell.

A more specific object of the invention is to provide a friction shock absorbing mechanism including a rectangular friction shell provided with detachable liners presenting opposed interior friction surfaces, the friction system co-operating with the liners, including friction shoes and a wedge member, wherein the wedge and shoes are provided with co-operating means to limit the relative movement thereof in a direction longitudinal of the gear, and wherein the liners and the walls with which the liners engage are provided with interengaging means, and the liners and the friction shoes are also provided with interengaging means, to limit the relative movement of the liners and shoes to a direction longitudinal of the mechanism and prevent displacement of the liners from central position with reference to the inactive wall surfaces of the friction shell.

Other objects and advantages of the invention will more fully and clearly appear from the description and claims hereinafter following.

In the drawings, forming a part of this specification, Figure 1 is a horizontal longitudinal sectional view of a railway draft rigging, showing one embodiment of my improvements in connection therewith. Figure 2 is a front end elevational view of the shock absorbing mechanism proper. Figure 3 is a vertical, transverse sectional view corresponding substantially to the line 3—3 of Figure 1. Figure 4 is a perspective view of the wedge member employed in connection with my improved mechanism illustrated in Figures 1, 2 and 3. Figure 5 is a perspective view of one of the friction shoes employed in connection with said mechanism. Figure 6 is a front elevational view partly broken away, of my improved friction shock absorbing mechanism illustrating a different embodiment of the invention. And Figure 7 is a horizontal sectional view corresponding substantially to the line 7—7 of Figure 6.

In said drawings, 10—10 indicate channel-shaped center or draft sills of a railway car underframe, to the inner surfaces of which are secured the usual front stop lugs 11—11 and the rear stop lugs 12—12. The inner end portion of the drawbar is designated by 13, to which is operatively connected a hooded yoke 14 of well known form. The shock absorbing mechanism proper as well as a front main follower 15 is disposed within the yoke and the yoke and the parts supported therewithin are maintained in operative position by a detachable saddle plate 16 fixed to the draft sills Referring first to the embodiment of the invention illustrated in Figures 1 to 5, inclusive, my improved shock absorbing mechanism proper comprises broadly: a spring cage A; a wedge block B; two friction shoes C—C; two liners D—D; a spring follower E; a main spring resistance F; and a retainer bolt G.

The spring cage A is in the form of a substantially rectangular box-like casting having a transverse vertically disposed rear end wall 17, vertically disposed spaced side walls 18—18, and horizontally disposed spaced top and bottom walls 19. The end wall 17 co-operates with the stop lugs 12—12 in the manner of the usual rear follower. The side walls of the casing are braced by horizontally disposed ribs which are formed integral with the rear wall 17 of the cage, the rear wall being extended laterally beyond the side wall 18 of said cage. The side walls 18 are thickened at their forward end and are cut away as indicated at 20 in Figures 1 and 3, thereby leaving inwardly extending flanges or ribs 21—21 at the outer end of the cage, having substantially flat vertically disposed inner faces. Rearwardly of the ribs 21, the cut out sections are formed to present grooves 22. The walls of the cut out portions 20 and the grooves 22 are of substantially V-shape as most clearly shown in Figure 3.

The liners D which are two in number, are of like construction, each being in the form of a relatively heavy plate having a flat abutment face 121 at the forward end thereof adapted to co-operate with the rib 21 of the cage and having a face 23 of V-section rearwardly of the face 121 corresponding in outline to the groove 22 and cut away portion 20 of the corresponding side wall 18 of the cage. It will be seen that each liner when assembled with the cage is held against longitudinal movement by the rib 21 and the groove 22 with which the corresponding parts of the liner co-operate and is maintained in central position on the side wall of the cage by the co-operating inter-engaging V surfaces on the liner and the cage. On the inner side, each liner is provided with a longitudinally disposed friction surface 24 which is also of V shaped section, as most clearly shown in Figures 2 and 3. The V shaped friction surfaces 24 of the opposed liners are preferably converged inwardly of the mechanism as most clearly illustrated in Figure 1. At the inner ends, the liners protrude inwardly beyond the corresponding side walls of the cage so as to present transverse abutment surfaces which co-operate with the spring follower E to limit outward movement of the latter.

The wedge B is in the form of a relatively heavy block having a slightly convex cylindrical end face 25 adapted to bear on the inner surface of the front follower 15. At the inner end, the wedge block B is provided with a pair of inwardly converging wedge faces 26 and 27, the wedge face 27 being disposed at a relatively keen wedge acting angle with respect to the longitudinal axis of the mechanism and the wedge face 26 being disposed at a relatively blunt releasing angle with reference to said axis. Although these two wedge faces are shown as disposed at different angles in the present disclosure of the invention, it will be evident that the same may be disposed at the same angle with reference to the axis of the mechanism. As most clearly shown in Figures 1 and 4, the wedge faces 26 and 27 are substantially flat and as shown in Figures 2, 3, and 4 terminate short of the top and bottom sides of the wedge block, thereby leaving top and bottom horizontally disposed shoulders 28—28 at opposite sides of the wedge for a purpose hereinafter described.

The friction shoes C—C, which are two in number, are disposed at opposite sides of the mechanism and are interposed between the wedge B and the liners D. Each of the friction shoes has a longitudinally disposed outer friction surface 124 which is of V shape and co-operates with the corresponding friction surface 24 of one of the liners D. On the inner side, each of the shoes C is provided with an enlargement 29 having a wedge face at the forward side thereof. The wedge face of the shoe which co-operates with the wedge face 26 of the wedge block B is indicated by 126 and is disposed at a relatively blunt angle to correspond with the wedge face 26 while the wedge face of the shoe C which co-operates with the keen wedge face 27 of the wedge block B is designated by 127 and is disposed at a relatively keen angle to correspond with the wedge face 27. The wedge faces 126 and 127 are both substantially flat throughout. Above and below the wedge faces, each shoe is provided with inwardly projecting horizontally disposed ribs 30 which engage over the shoulders 28 of the wedge block B. It will thus be seen that the inner sides of the shoes are of substantially channel form and receive the corresponding side of the wedge B, thereby preventing relative vertical displacement of the wedge block B and the friction shoes C and limiting these parts to longitudinal relative movement with reference to the mechanism. It will further be evident that due to the shoes C and the liners D having interengaging V shaped friction surfaces, these parts will also be limited to movement in a direction longitudinal of the mechanism, and held against displacement in a vertical direction. By providing the V-shaped co-perating faces on the liners and the cage A, these parts will also remain centered when the mechanism is assembled.

From the foregoing description, it will be evident that by the arrangement of inter-engaging parts on the wedge block B, the friction shoes C—C and the liners D, the entire friction system will be maintained in spaced relation to the top and bottom walls, thereby preventing wear of the top and bottom surfaces of the friction shell and thus adding materially to the life of the latter.

The spring follower E is in the form of a heavy flanged ring having the flange thereof bearing on the inner ends of the liners D, thereby limiting the outward movement of the spring follower. The outer end of the ring section of the spring follower bears on the inner ends of the friction shoes.

The main spring resistance F comprises a relatively heavy outer coil and a lighter inner coil. The inner coil has the front end thereof bearing on a spring follower disk 31 which is turn bears on the inner ends of the enlargements 29 of the friction shoes. The rear end of the spring bears on a hollow boss projecting inwardly from the end wall 17 of the cage A. The outer heavy coil has its front end bearing on the flange of the spring follower E and the rear end bearing directly on the wall 17 of the cage.

The mechanism is maintained assembled and of uniform overall length by the retainer bolt G which has the head thereof anchored in the hollow boss of the end wall 17 of the spring cage and the nut thereof anchored to the wedge block B. The retainer bolt not only holds the parts assembled, but also maintains the spring resistance element E under initial compression. Due to the initial compression under which the main spring is held, the wedge, friction shoes and liners will always be maintained under lateral pressure and held in centered position. Compensation for wear of the various friction and wedge faces is also provided by the expansive action of the spring resistance means which, as hereinbefore pointed out, is under initial compression.

The operation of my improved shock absorbing mechanism, assuming a compression stroke, is as follows: The front follower 15 and the cage A will be moved relatively toward each other, thereby causing the wedge block B to be carried inwardly of the cage, setting up a wedging action between the block and the friction shoes C and also carrying the shoes inwardly of the spring cage along the friction surfaces of the liners D, compressing the main spring resistance F. Inasmuch as the interengaging surfaces of the friction shoes and the liners are of V-shape, and the friction shoes are provided with flanges which overhang the wedge block, the parts will be confined to longitudinal movement only, thereby preventing engagement of the top and bottom sides of the shoes and wedge with the top and bottom walls of the cage and eliminating wear of these parts as hereinbefore pointed out. When the mechanism has been fully compressed, the outer end of the cage will be engaged directly by the main follower, thereby preventing undue compression of the main spring resistance, the casing A acting as a solid column load transmitting member to transmit the shock directly to the draft sills. When the actuating force is reduced, the expansive action of the spring resistance E will restore the friction shoes and wedge block to the normal position shown in Figure 1.

By the provision of the convex end face on the wedge block, contact between the co-operating wedge faces of the block and the shoes is assured, inasmuch as the wedge is permitted to have limited rocking movement on the main follower.

Referring next to the embodiment of the invention illustrated in Figures 6 and 7, it is pointed out that the general arrangement is substantially the same as that illustrated in Figures 1 to 5, inclusive, the mechanism comprising a main wedge, friction shoes, liners detachably connected to the casing, and a main spring resistance opposing movement of the friction shoes. The embodiment illustrated in Figures 6 and 7 differs from that shown in Figures 1 to 5, inclusive, in that the cage A and the liners are provided with a co-operating longitudinally disposed rib and groove to prevent the liners from being displaced vertically with respect to the cage.

In Figures 6 and 7, the friction shoe is indicated by C', the liner by D' and the casing or cage by A'. The liners D' are provided with V shaped friction surfaces which are precisely the same as the friction surfaces of the liners D hereinbefore described and co-operate with similar V-shaped friction surfaces on the shoes C'. The casing A' and the liners D' are also provided with interengaging V shaped faces similar to the corresponding engaging faces on the casing A and the liners D hereinbefore described. Centrally of the V shaped faces of the side walls 118 of the cage A', longitudinally extending ribs 40 are provided. The ribs as shown are preferably of curved cross section, although V-shaped or other forms of ribs may be employed. The liners D' are provided with grooves 41 which are adapted to receive the ribs 40 to positively interlock the liners D' with respect to the casing A' against vertical displacement.

The operation and function of the invention illustrated in Figures 6 and 7 is precisely the same as that of the embodiment of the invention illustrated in Figures 1 to 5, inclusive.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage having a plurality of side walls, two of said side walls being opposed; of a spring resistance within the cage; a pair of detachable liners mounted on said opposed side walls; means for preventing relative longitudinal movement of said liners and cage, said liners and side walls of the cage having interengaging faces thereon for holding the liners centered on said walls; a pair of friction shoes co-operating with the liners; a wedge block engaging said shoes, said wedge block and shoes having interengaging shoulders thereon for confining relative movement of the shoes and wedge block to a direction longitudinal of the mechanism, and said shoes and liners being provided with interengaging means for holding all of said parts centered on said side walls and uniformly spaced from the remaining walls of the cage.

2. In a friction shock absorbing mechanism, the combination with a rectangular friction shell having top, bottom and side walls, said side walls being provided with detachable liners presenting opposed interior friction surfaces, said side walls and liners having interengaging ribs thereon for holding the liners against vertical displacement; of a pair of friction shoes having friction surfaces interengaging with the friction surfaces of the liners to hold said shoes and liners against relative vertical displacement and maintain the shoes spaced from the top and bottom walls of the shell; a wedge block co-operating with the shoes, said block and shoes having interengaging means thereon for preventing vertical displacement of the wedge and shoes and maintaining the wedge spaced from the top and bottom walls of the shell; and a spring resistance means within the cage.

3. In a friction shock absorbing mechanism, the combination with a spring cage having opposed side walls and top and bottom walls; of a main follower, said main follower and cage being relatively movable toward and away from each other; a wedge block; a pair of friction shoes co-operating with said wedge block, said shoes having top and bottom flanges overhanging the wedge block, thereby limiting the wedge block and shoes to movement in a direction longitudinal of the mechanism; detachable liners anchored to the cage against longitudinal movement, said liners and shoes having co-operating V-shaped friction surfaces and the interengaging faces of the side walls of the cage and the liners being formed to hold said liners centered on said side walls; and a main spring resistance opposing inward movement of the friction shoes.

In witness that I claim the foregoing I have hereunto subscribed my name this 31st day of January, 1927.

WILLIAM A. GEIGER.